Jan. 27, 1959

W. H. BUDD 2,871,324

MULTIPLE VARIABLE RESISTANCE CONTROL WITH COMMON SNAP-IN MOUNTING

Filed March 26, 1956

4 Sheets-Sheet 1

Inventor
Wilbert H. Budd
By [signature]
Attorney

Inventor
Wilbert H. Budd
By
Attorney

Inventor
Wilbert H. Budd
By [signature]
Attorney

Inventor
Wilbert H. Budd
By
Attorney 2,871,324

MULTIPLE VARIABLE RESISTANCE CONTROL WITH COMMON SNAP-IN MOUNTING

Wilbert H. Budd, Elkhart, Ind., assignor to Chicago Telephone Supply Corporation, Elkhart, Ind., a corporation of Indiana Application March 26, 1956, Serial No. 573,890

18 Claims. (Cl. 201—55)

This invention relates to variable resistors and refers more particularly to variable resistance controls of the so-called preset type.

Preset variable resistance controls are now used extensively to facilitate critical adjustments in the various sensitive electrical circuits of television receivers required for good quality reception. These circuits are usually adjusted before the receiver leaves the factory and need be adjusted only infrequently thereafter, consequently, preset controls may be and usually are mounted in relatively inaccessible locations on the television receiver, but it is an advantage to have all these controls in substantially the same place on the receiver.

To this end, it is an object of the present invention to provide a multiple preset variable resistance control which may be quickly and easily assembled into a television receiver as a single unit, regardless of how many individual circuits are to be controlled thereby.

Those skilled in this art are fully cognizant of the fact that control manufacturers are continually being urged by set makers to lower the price of their controls. Accordingly, the control industry is forever seeking to effect reductions in the cost of manufacturing their respective circuit components, but of course, without sacrificing quality. One of the criteria of quality in a control of this type is suitable protection against the effects of dust accumulation and other such sources of trouble. To meet this objective and still satisfy the demand for low manufacturing costs is another purpose of the present invention and is achieved through the use of a common enclosure or housing for all of the several preset controls needed, whether it be two, three or four, or even more.

The ease and facility with which a control may be mounted on a receiver chassis is another very important consideration, especially where the control must be adapted for connection into a printed circuit. To meet this objective, snap-in mountings have been developed for variable resistors and the like, and one such mounting forms the subject matter of the pending application, Serial No. 396,296, filed by Wilbert H. Budd et al., December 4, 1953, now Patent No. 2,740,027. The present invention utilizes the snap-in mounting feature of that pending application but improves thereon by making the mounting means an integral part of the housing or enclosure for the control without, however, requiring that the walls of the housing be objectionably cut away. Accordingly, it is another purpose of this invention to provide an improved snap-in mounting for controls of the type described, which is characterized by the provision of relatively long resilient leg elements formed as an integral part of the housing or enclosure, and provided with snap-in fastening devices engageable in openings in a mounting panel.

As indicated hereinbefore, one of the objectives of this invention is to enable a number of individual resistors to be mounted as a single unit. This may be done, as in some of the embodiments of the invention herein disclosed, by having a single base for all of the resistors and having that one base coact with a metal cover to form an enclosure, but it is also an object of this invention to collectively mount a number of wholly independent and separate resistors, each of which has its own individual base, to thereby obviate the need for a special base whenever the number of resistors to be grouped is changed.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which.

Figures 6, 7, 8:
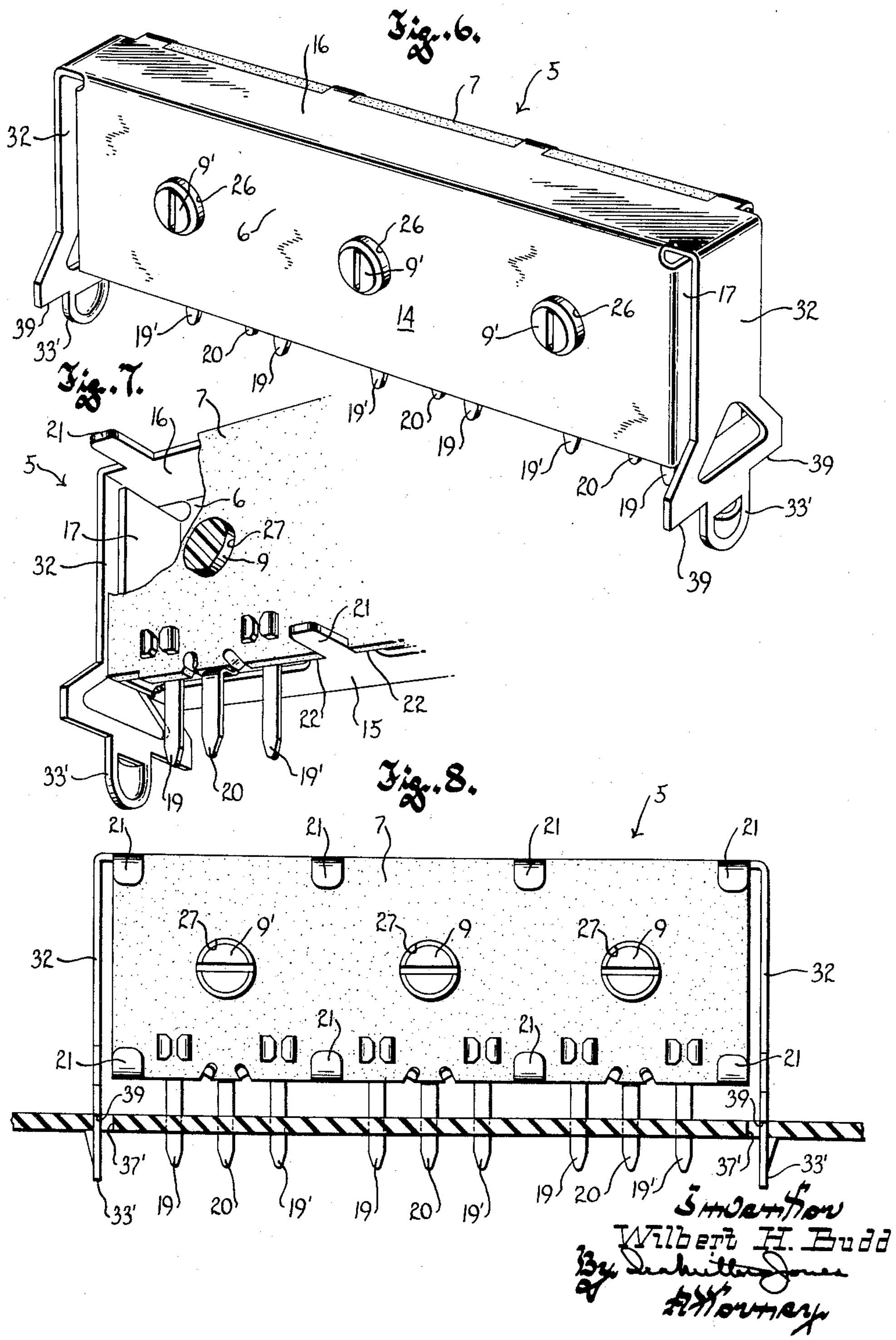
Figure 6 is a rear perspective view of a multiple resistance control illustrating a modified embodiment of this invention.
Figure 7 is a perspective view looking at the front and bottom of the control shown in Figure 6, said view having parts thereof broken away.
Figures 9, 10, 11, 12:
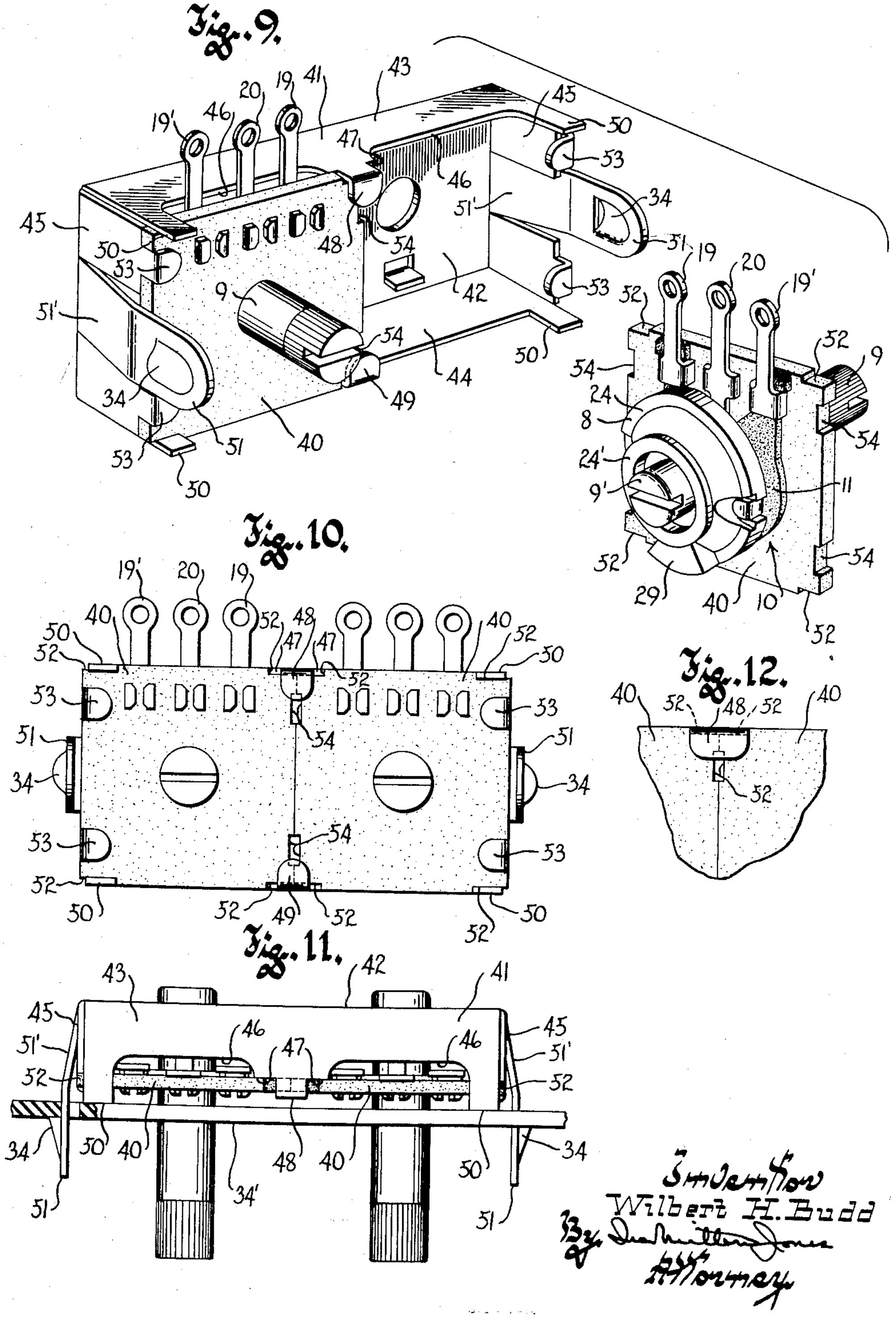

Figure 8 is a front view of the control of Figures 6 and 7 illustrating the same mounted on a panel, and it is to be noted that in this case the control is of the type especially adapted for use with printed circuits in that the terminals of the several resistors project in the same direction as the snap-in fastening means and are adapted to pass through holes in the panel upon which the control is mounted to be soldered to leads printed on the underside of the panel;

Figure 9 is an exploded perspective view of still another embodiment of this invention, which is characterized especially by the fact that each resistor has its own base, all of the bases being identical to one another and held in abutting side-by-side relation by the metal cover;

Figure 10 is a front view of the control shown in Figure 9;

Figure 11 is a top view thereof illustrating the same mounted on a panel; and

Figure 12 is a fragmentary detail view similar to a portion of Figure 10, but showing a slight modification of the means employed to hold the bases of the resistors assembled with the cover.

Referring now particularly to the accompanying drawings in which like numerals indicate like parts throughout the several views, and considering first that embodiment of the invention illustrated in Figures 1 to 5 inclusive, it will be seen that the composite or multiple control there shown comprises two separate resistors arranged side-by-side in a common housing indicated generally by the numeral 5. The housing is formed by an oblong shaped metal box-like cover 6 and a wall 7 of insulating material secured across the open front of the cover.

Each of the two resistors comprises a rotor 8 provided with an operating shaft 9 and a stator 10 which consists of an arcuate resistance element 11 encircling a metal collector ring 12. The stators of both of the resistors are mounted on the inner face of the wall 7 so that this wall serves as the base of both resistors.

Figure 5:
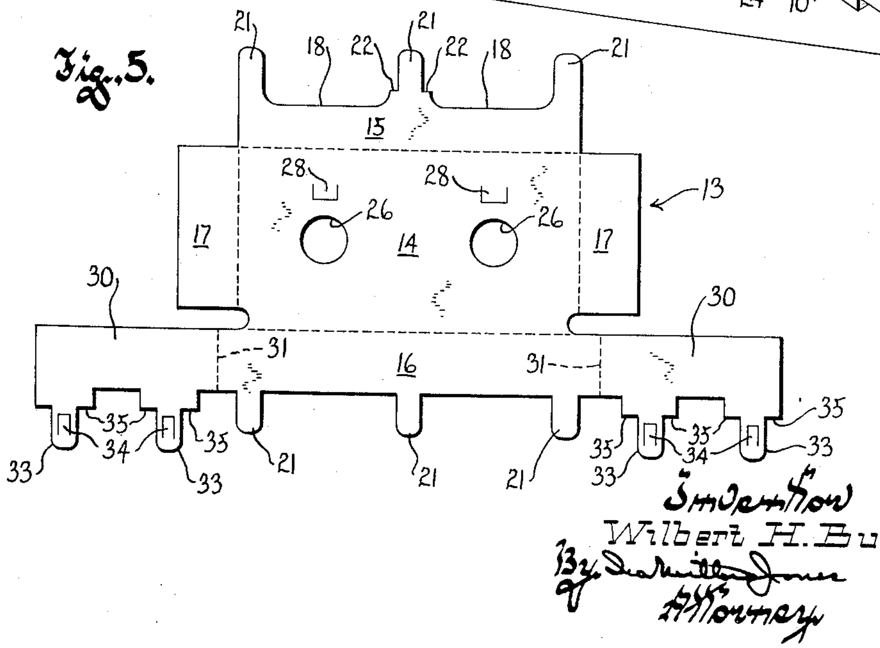
Figure 5 is a plan view of the stamping from which the metal cover is formed.

The cover 6 is formed from a single sheet metal stamping 13 the shape of which is illustrated in Figure 5. When formed up it is a rectangular or oblong box having a bottom wall 14, two long side walls 15 and 16, and two opposite end walls 17. The edges of the end walls 17 and of the long side wall 16 lie in a common plane to support the wall 7, but the edge of the other side wall 15 is cut away in two places as at 18 to accommodate the resistor terminals 19, 19' and 20, which are fixed to the wall 7 and extend respectively from the ends of the resistance elements 11 and the collector rings 12.

The cover 6 and the base-forming wall 7 are held assembled by tangs 21 projecting from the edges of the walls 15 and 16 and folded over the front of the wall 7; and it is to be noted that one of these tangs, namely the one which projects from the center of the wall 15 is flanked by two shoulders 22 which lie in the plane of the outer edges of the walls 16 and 17, and thus cooperates therewith to support the wall 7 against inward displacement, it being understood that at each tang location the edge of the wall 7 is notched to receive the tang. The arrangement described firmly connects the resistor base or wall 7 and metal cover and establishes a definite spacing between the inner face of the base upon which the stators of the resistors are mounted and the rear wall of the housing provided by the bottom 14 of the box-like cover. This fixed dimensional relationship between the base and the wall 14 is important in that it establishes the contact pressure between the resistance elements and the contactor fingers or paddles 23 of the rotors 8.

These rotors 8 may be like that illustrated and forming the subject matter of Patent No. 2,717,944, issued to Arthur M. Daily et al., and accordingly, each rotor comprises a unitary molding of suitable insulating material having, in addition to its shaft 9, a disc or flange portion 24. Secured to the front part of this flange portion is the contactor 25 of the rotor with its paddles 23 in position to traverse the resistance element and collector ring and thereby impose a rearward thrust upon the rotor. This thrust is carried by a circular bearing surface 24' on the rear of the flange portion riding upon the cover wall 14. The rotor preferably also has a short rearwardly projecting shaft extension 9' received in a hole 26 in the cover wall 14 coaxially disposed with respect to a hole 27 in the wall 7 through which the main shaft 9 of the rotor projects. Rotation of the rotors is limited to a predetermined angle by fixed stops 28 struck in from the cover wall 14 and positioned to be engaged by abutments 29 on the rotor.

The structure thus far described provides a compact unitary assembly for two or more resistors, it being understood that when more than two resistors are to be accommodated it is only necessary to increase the length of the wall 7 and of the metal cover 6.

The mounting of the multiple or composite unit upon a supporting panel is accomplished in a very simple manner involving a snap-in attachment similar to that of the aforesaid Patent No. 2,740,027. To this end the sheet metal blank 13 from which the cover 6 is formed is provided with two extensions 30 projecting from the opposite ends of that part of the blank which forms the cover wall 16. These extensions 30 are bent up along bend lines 31 to form legs 32 overlying the end walls 17 in spaced parallel relation thereto. By virtue of the space between the legs 32 and the walls 17, the legs may be flexed toward and from the ends of the cover, and hence toward and from one another.

Figures 1, 2, 3:
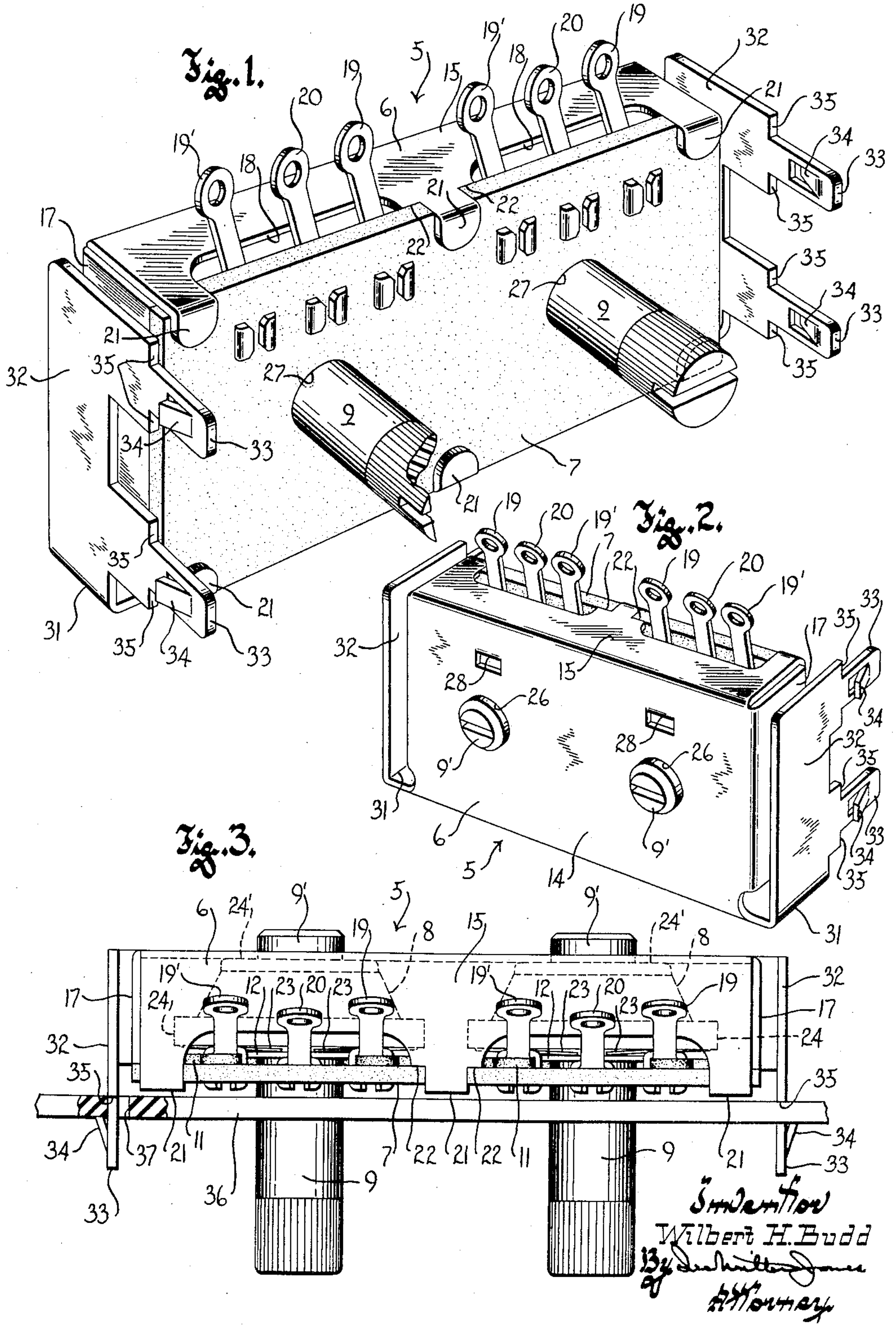
Figure 1 is a perspective front view of a multiple resistance control constructed in accordance with one embodiment of this invention.
Figure 2 is a perspective rear view of the control shown in Figure 1.
Figure 3 is a top view of the control illustrating the same mounted on a panel, as for instance a wall of the receiver chassis.
Figure 4:
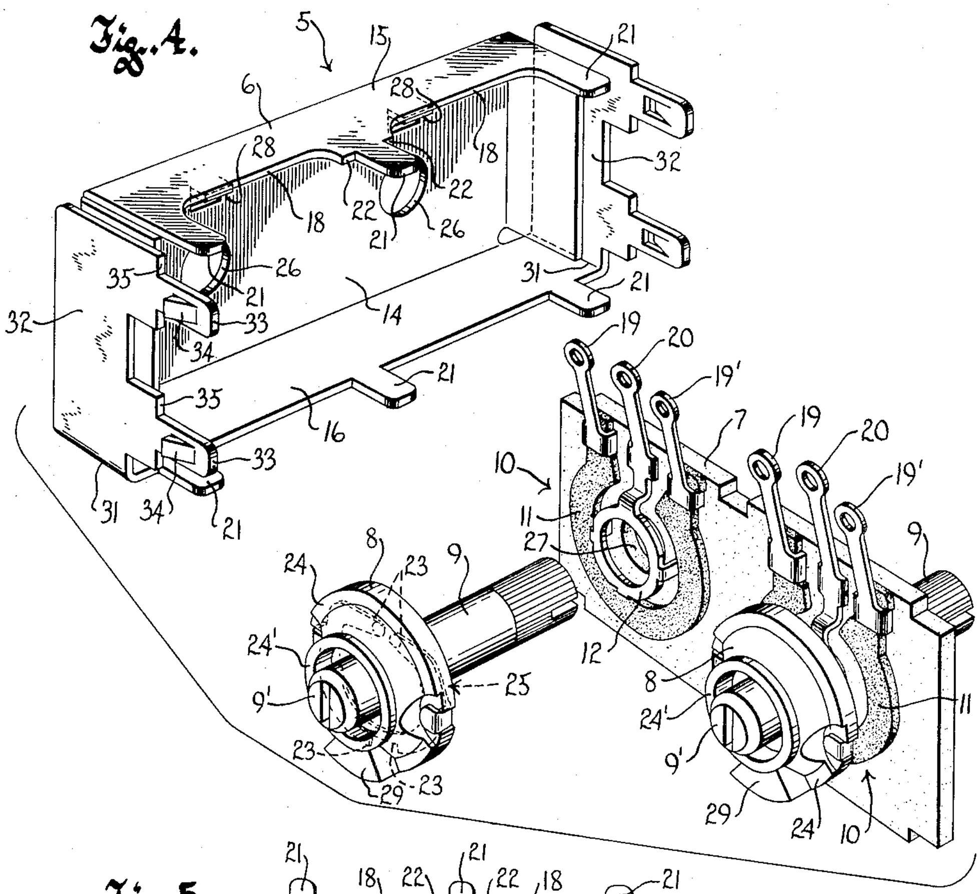
Figure 4 is an exploded perspective view of the control and illustrating particularly the construction of the metal cover which coacts with the base of the control to form the housing or enclosure.

Projecting from that edge of the legs 32 nearest the ends of the insulating base wall 7 are tongues 33 equipped with barbs 34 and flanked by locating shoulders 35. All of the shoulders lie in a common plane parallel to and spaced forwardly of the base wall 7, and when the control is secured to its mounting panel 36 these shoulders engage the panel and properly space the control therefrom while the tongues 33 pass through appropriately located holes 37 in the panel. The barbs 34 are so disposed that their ends face the shoulders 35 and are spaced therefrom a distance to accommodate the thickness of the panel. Hence as the tongues enter the holes 37, and the shoulders come up against the panel, the ends of the barbs engage over the front face of the panel as shown in Figure 3.

It is to be understood that the spacing between the rearwardly facing ends of the barbs 34 and the shoulders 35 is determined by the thickness of the panel upon which the control is to be mounted, and also that the holes 37 are of a size and so spaced as to effect the flexure of the tongues 33 necessary to cause the barbs to snap over the edges of the holes to their positions at which they secure the control to the panel.

*The modification of Figures 6 to 8 inclusive*

Figures 6, 7 and 8 illustrate a modified embodiment of the invention which differs from that just described principally in the arrangement of the terminals, which are so disposed in this form of the invention that when the control is mounted upon a supporting panel the terminals protrude through holes in the panel to adapt the control to use with printed circuits. Thus, it will be noted that the attaching tongues 33' which pass through the holes 37' in the mounting panel are on the extreme outer ends of the legs 32 and project in the same direction as the resistor terminals 19, 19' and 20. Locating shoulders 39 comparable to the shoulders 35 flank the attaching tongues, and lie in a common plane inwardly of the extremities of the terminals. Hence, when the control is mounted in position upon a panel as shown in Figure 8, the resistor terminals project through appropriate holes in the panel to be readily soldered to circuit leads printed on the underside of the panel.

In other respects the control shown in Figures 6, 7 and 8, is the same as that of Figures 1 to 5 inclusive.

*The modification of Figures 9–12*

In the two embodiments of the invention described above, a single sheet of insulation provides the base for all of the resistors regardless of how many are grouped to make up the multiple control. This, of course, necessitates different sized bases for controls having different numbers of individual resistors. In the modification of the invention shown in Figures 9 to 12, however, each resistor has its own base 40, but all of the bases are identical. In fact, the complete resistors are structurally identical to one another and any number of them may be assembled side-by-side and held in assembled relationship by a metal cover 41 of appropriate length.

The cover 41 is very much like those of the previously described embodiments of the invention in that it has a rectangular shape and is formed up from a single blank of sheet metal to have a bottom wall 42, opposite side walls 43 and 44, and end walls 45. Also, the edges of the side wall 44 and of the end walls 45 lie in a common plane, while the side wall 43 has its edge portion cut out as at 46 to accommodate the terminals of the resistors. If the control is to have two resistors as shown in the drawings, the side wall 43 has a pair of locating shoulders 47 flanking a tang 48 which is directly opposite a similar tang 49. The shoulders 47 are coplanar with the edges of the walls 44 and 45, and coact with said edges to support the bases 40.

At their outer ends the side walls 43 and 44 have feet 50 projecting therefrom, the ends of all of which lie in a common plane spaced forwardly from the front of the bases to engage the rear face of the mounting panel 34' and properly space the control a short distance back from the panel.

The legs which carry the attaching tongues 51 in this embodiment of the invention are provided by portions 51' of the end walls 45, sheared from said end walls and struck outwardly therefrom about the junctions of said end wall portions 51' with the rear wall 42. The legs thus formed are accordingly integral with the rear wall 42 and spaced from the ends of the housing so as to have some movement towards and from one another as in the previous embodiments of the invention. Also, as in the other embodiments of the invention barbs 34 are struck out from the tongues and positioned to engage over the front face of the panel as the control is snapped in place.

To accommodate the projections 50 and the tangs 48 and 49, the corners of the bases 40 are notched as at 52. These notches are of a size to snugly receive the feet 50 and therefore, if the tangs 48 and 49 are no wider than the feet 50, they will not fill the space formed by the two notches 52 of the adjacent resistor bases 40. This would not be serious but if it is deemed objectionable the tangs 48 and 49 could be made twice as wide as the feet 50 so as to fully occupy the space resulting from the two adjacent notches 52, as shown in the fragmentary detail view Figure 12.

The securement of the bases 40 to the metal cover is effected jointly by the tangs 48 and 49 and tangs 53 on the end walls 45. The tangs 53 are, of course, received in notches 54 in the edges of the bases, and accordingly, there will be small rectangular holes where these notches of adjacent bases 40 meet.

In other respects, as for instance, the manner in which the rotors of the resistors are held against endwise displacement by the bases 40 and the opposite wall 42 of the metal cover, and the mounting of the resistance elements and collector rings of the resistors on the bases 40, are all as previously described.

From the foregoing description taken in connection with the accompanying drawings, it will be apparent to those skilled in this art that this invention provides an extremely practical multiple preset control for use in television receivers, and that the single mounting for a number of resistors is a highly advantageous feature since it reduces the time involved in mounting the resistors; and that the invention is especially well adapted to use with printed circuits.

What is claimed as my invention is:

1. A variable resistance control adapted for mounting on a supporting panel comprising: a rectangular housing consisting of a sheet metal cover having a flat rear wall and forwardly projecting side and end walls joined to the peripheral edges of the rear wall, and a front wall of insulating material connected to the forward edges of said side and end walls in spaced parallel relation to said flat rear wall; cooperating stationary and movable elements within the housing providing a variable resistor; terminals for the control having end portions projecting from the housing; a pair of resilient supporting legs for the control, each having a fixed end integral with one of two opposite portions of one of the housing walls and a free end terminating near the opposite housing wall so that said supporting legs have substantial length, the housing being positioned between the legs but spaced therefrom so that the legs may be flexed toward and from one another; locating shoulders carried by the housing and lying in a common plane outwardly of the wall of the housing which overlies the supporting panel when the control is in place thereon, so that when said shoulders bear against the supporting panel said housing wall will be spaced a definite distance from the supporting panel; and snap-in fastening means on said legs at portions thereof spaced a substantial distance from the fixed ends thereof and projecting beyond the locating shoulders to enter holes in the panel and secure the legs to the panel.

2. The control of claim 1 wherein the mounting means comprises legs on the cover and each provided with a tongue and a locating shoulder on the tongue facing towards the end of the tongue, and each of said tongues having a barb sheared therefrom and having its end facing the shoulder to snap over the edge of a hole in the mounting panel when the tongue is projected through the hole and the shoulder bears against the panel.

3. The variable resistor of claim 1 further characterized by the fact that the fixed ends of the legs are integral with the opposite ends of one of the housing side walls so that the legs overlie the end walls of the housing; by the fact that the snap-in fastening means comprises barbed tongues projecting from the side edges of the legs nearest the insulated front wall of the housing beyond the plane of said front wall; and by the fact that the locating shoulders lie in a plane parallel to and forwardly of said front wall.

4. The variable resistor of claim 3 but wherein the locating shoulders are on the tongues.

5. The variable resistor of claim 1 further characterized by the fact that the fixed ends of the legs are integral with the opposite ends of one of the side walls of the housing so that the legs overlie the end walls of the housing; by the fact that the snap-in fastening means comprises barbed tongues projecting from the extremities from the legs and beyond the plane of the other side wall of the housing; and by the fact that the locating shoulders lie in a plane parallel to and outwardly of said other side wall.

6. The variable resistor of claim 5 but wherein the locating shoulders are on the legs at the bases of the tongues.

7. The variable resistor of claim 1 further characterized by the fact that the legs comprise portions sheared from the end walls of the housing and the fixed ends of the legs are integral with the rear wall of the housing; by the fact that the snap-in fastening means comprises barbed tongues projecting from the extremities of the legs and beyond the insulated front wall; and further characterized by the fact that the locating shoulders lie in a plane parallel to and forwardly of the front wall of the housing.

8. The variable resistor of claim 7 but wherein the locating shoulders are on the legs at the bases of said tongues.

9. A multiple variable resistance control comprising: a sheet metal cover oblong in shape and having a flat back wall and opposite side and end walls projecting forwardly from the marginal edges of the back wall; a front wall of insulating material secured across the front of said cover; said front wall having a plurality of control shaft holes spaced along the length thereof; a plurality of arcuate resistance elements and collector rings on the inner face of said insulated front wall, a pair thereof concentrically embracing each control shaft hole; terminals for the resistance elements and collector rings fixed to the front wall and projecting through one of the side walls of the cover; a rotary contactor bridging each resistance element and its collector ring; means rotatably mounting said rotary contactors inside the housing defined by the metal cover and its front wall, said means including a control shaft for each contactor journalled in the adjacent shaft hole; and means integral with the cover for mounting the entire unit upon a panel with the control shafts in a predetermined positional relationship with respect to the panel.

10. A variable resistor for use with printed circuit panels comprising: a substantially rectangular housing having parallel front and back walls connected by bottom, top and end walls of sheet metal; cooperating stationary and movable elements within the housing providing a variable resistor; terminals for the stationary elements having end portions projecting downwardly from the bottom wall of the housing for entry into appropriately located holes in a printed circuit panel; supporting legs for the resistor having fixed ends joined to the housing at the upper corners thereof and extending downwardly in overlying but spaced relation to the end walls of the housing with the free ends of the legs projecting beyond the bottom of the housing; panel engaging shoulders on the free end portions of the legs lying in a plane below the bottom of the housing but above the extremities of the terminals so that the terminals may project into holes in the panel when said shoulders are seated on the panel; and snap-in fastening means on the ends of the legs below their panel engaging shoulders to snap into other holes in the panel and thus coact with said shoulders in securing the resistor to the panel, the length of the legs giving them flexibility to facilitate the insertion of their fastening means into their respective holes.

11. A variable resistance control adapted for use on printed circuit panels comprising: a housing consisting of a sheet metal cover having a flat rear wall and forwardly projecting side walls joined to the peripheral edges of the rear wall, and a front wall of insulating material connected to the forward edges of said side walls in spaced parallel relation to said flat rear wall; cooperating stationary and movable elements within the housing providing a variable resistor; terminals for the stationary elements having end portions substantially parallel to one another and projecting from the housing for insertion into appropriately located holes in a printed circuit panel; a pair of resilient supporting legs for the control, each of said legs having a fixed end integral with one of two opposite portions of one of the housing side walls and a free end portion overlying the adjacent wall of the housing but spaced therefrom so that the housing is positioned between the legs and the legs may be flexed toward and from one another; locating shoulders on said legs lying in a common plane between the extremities of the terminals and the portion of the housing beyond which the terminals project so that when said shoulders bear against a mounting panel the terminals may protrude through appropriately located holes in the panel; and snap-in fastening means on said legs projecting beyond the locating shoulders to enter other holes in the panel and secure the legs to the panel.

12. The control of claim 11, but wherein the panel engaging shoulders are on the free ends of the legs, and the snap-in fastening means are the endmost portions of the legs so that the freedom of the legs to be flexed towards and from one another affords maximum motion for the snap-in fastening means.

13. As an article of manufacture, a combined housing member and mounting unit for an electrical control unit comprising: a sheet metal cover having a back wall and angularly disposed pairs of opposite side and end walls integral with and substantially perpendicular to said back wall; a mounting leg formed as an extension of one of said side walls and having a fixed end integral with one end of said side wall, the remainder of the leg being free and overlying the adjacent end wall in spaced relation thereto; and means on said leg for securing the same to a supporting panel.

14. The article of manufacture set forth in claim 13 but wherein the free end of the leg projects beyond the opposite side wall of the housing, and the securing means is on the extremity of the free end.

15. In a variable resistor having a resistance path and a conductive path on one face of a base of insulating material, and having a movable contactor bridging said paths and provided with a control shaft passing through the base, a combined cover and mounting for the resistor comprising a stamped and formed sheet metal box-like member having a back wall and angularly disposed opposite side and end walls integral with and substantially perpendicular to the back wall; a pair of resilient legs each having a fixed end integral with one end of one of the side walls, and extending therefrom with the free ends thereof remote from said side wall, said legs overlying the adjacent end walls in spaced relation thereto so that the entire cover is embraced by said legs and the legs are resiliently movable towards and from one another; and snap-in fastening means on the legs adapted to enter holes in a mounting panel, the resilience of the legs and the spacing thereof from the adjacent end walls of the cover facilitating the engagement of the fastening means with the panel.

16. The structure of claim 15 but wherein the free ends of the legs project beyond the side wall of the housing opposite that from which the legs extend, and wherein the fastening means is on the extremities of the free ends of the resilient legs and comprises a tongue projecting from each leg, a locating shoulder at the base of the tongue, and a barb projecting from the tongue with its end facing the shoulder.

17. A composite variable resistor control unit comprising: a plurality of identical variable resistors, each having a rectangular base of insulating material with a resistance element and conductive path on the inner face thereof, and terminals fixed to the base and electrically connected to the resistance element and conductive path, all of said bases being of identical size and shape and all of said resistors also having rotatable contactors arranged to traverse and bridge their respective resistance elements and conductive paths and having control shafts passing through holes in the bases; a common metal cover for all of the resistors, said cover being of oblong shape and having a flat rear wall and opposite side and end walls projecting perpendicularly from the rear wall, the opening defined by the side and end walls being coextensive in size and shape with the combined areas of the resistor bases when said bases are disposed side by side and contiguous to one another; means securing said bases to the side and end walls so that said bases collectively form a front wall for the housing formed jointly by the cover and the bases; and mounting means integral with said cover, said mounting means comprising resilient legs projecting from the cover and having locating shoulders thereon adapted to seat upon a mounting panel, and snap-in fastening means on said legs projecting beyond the locating shoulders to enter and snap into holes in the mounting panel.

18. A multiple variable resistance control comprising: a plurality of bases of insulating material, said bases being of identical rectangular size and shape and being arranged side by side with adjacent edges thereof abutting one another so that collectively said bases form a wall of insulating material; cooperating stationary and movable variable resistor forming elements carried by each of said bases, to thereby provide a plurality of variable resistors, one for each base, the movable element of each such variable resistor having a rotatable control shaft, one end portion of which is journalled in a hole in its respective base to be accessible for manipulation at the front of the base, and the other end portion of which projects rearwardly of the base; a box-like metal cover having a rear wall provided with a plurality of control shaft receiving and supporting holes, one for each variable resistor, said cover also having forwardly projecting opposite side and end walls integral with its rear wall, the open front of the cover being coextensive in size and shape to the wall of insulating material formed collectively by said bases; and fastening means securing all of the bases to the cover with said bases extending across and closing the open front of the cover so that said cover and the bases together form one common housing for all of the variable resistors, the front wall of which is formed by the bases, and the distance between the front and rear walls of the housing being less than the length of the rearwardly projecting portions of the control shafts, and said portions of the control shafts extending into and being journalled in the shaft receiving and supporting holes in the rear wall of the cover.

References Cited in the file of this patent

UNITED STATES PATENTS

| | | |
|---|---|---|
| 1,225,525 | Sweet | May 8, 1917 |
| 2,493,184 | Budd et al. | Jan. 8, 1950 |
| 2,520,725 | Judd | Aug. 29, 1950 |
| 2,536,181 | Hultgren | Jan. 2, 1951 |
| 2,680,225 | Stevens | June 1, 1954 |
| 2,703,662 | Meyer | Mar. 8, 1955 |
| 2,740,026 | Budd et al. | Mar. 27, 1956 |
| 2,740,027 | Budd et al. | Mar. 27, 1956 |